United States Patent
Hagen

(10) Patent No.: US 10,747,971 B2
(45) Date of Patent: Aug. 18, 2020

(54) IDENTIFICATION VERIFICATION USING A DEVICE WITH EMBEDDED RADIO-FREQUENCY IDENTIFICATION FUNCTIONALITY

(71) Applicant: IDchecker, Inc., San Diego, CA (US)

(72) Inventor: Michael Hagen, Los Altos, CA (US)

(73) Assignee: IDchecker, Inc., San Diego, CA (US)

( * ) Notice: Subject to any disclaimer, the term of this patent is extended or adjusted under 35 U.S.C. 154(b) by 0 days.

(21) Appl. No.: 16/529,293

(22) Filed: Aug. 1, 2019

(65) Prior Publication Data

US 2019/0354736 A1    Nov. 21, 2019

Related U.S. Application Data

(63) Continuation of application No. 15/604,372, filed on May 24, 2017, now Pat. No. 10,372,950, which is a
(Continued)

(51) Int. Cl.
*G06K 9/00* (2006.01)
*G06K 7/10* (2006.01)
(Continued)

(52) U.S. Cl.
CPC ..... *G06K 7/10386* (2013.01); *G06K 7/10009* (2013.01); *G06Q 10/10* (2013.01); *G06Q 50/00* (2013.01)

(58) Field of Classification Search
CPC ......... G06K 7/10386; G06K 7/100009; G06Q 10/10; G06Q 50/00
See application file for complete search history.

(56) References Cited

U.S. PATENT DOCUMENTS 5,881,172 A    3/1999   Pintsov
7,168,614 B2   1/2007   Kotovich et al.
(Continued)

FOREIGN PATENT DOCUMENTS

EP    1646966 A2    4/2006
EP    1677231 A1    7/2006
(Continued)

OTHER PUBLICATIONS

"Machine Readable Travel Documents Part 11, Security Mechanishs for MRTDS", Doc 9303, International Civil Aviation Organization, Seventh Edition, 2015, 112 pages.
(Continued)

*Primary Examiner* — Aaron W Carter
(74) *Attorney, Agent, or Firm* — Carr & Ferrell LLP

(57) ABSTRACT

A method for identification (ID) verification using a device with embedded radio-frequency identification (RFID) functionality is disclosed. The method comprises capturing, by a camera associated with a client device, an image of an ID document having an embedded RFID chip. The image is transmitted to a server for optical character recognition to extract and recognize printed data associated with the ID document. The client device can receive the printed data from the server and use the printed data to unlock the RFID chip by an RFID reader. Digital data associated with the ID document can be retrieved from the RFID chip and compared to the printed data. If the digital data and the printed data match, the ID document is verified. Otherwise, the ID document is rejected.

16 Claims, 5 Drawing Sheets

Related U.S. Application Data continuation of application No. 14/722,058, filed on May 26, 2015, now Pat. No. 9,665,754.

(60) Provisional application No. 62/204,101, filed on May 28, 2014.

(51) Int. Cl.
*G06Q 50/00* (2012.01)
*G06Q 10/10* (2012.01)

(56) References Cited

U.S. PATENT DOCUMENTS

| | | | |
|---|---|---|---|
| 7,201,323 B2 | 4/2007 | Kotovich et al. | |
| 7,249,717 B2 | 7/2007 | Kotovich et al. | |
| 7,430,310 B2 | 9/2008 | Kotovich et al. | |
| 7,657,091 B2 | 2/2010 | Postnikov et al. | |
| 7,778,457 B2 | 8/2010 | Nepomniachtchi et al. | |
| 7,787,695 B2 | 8/2010 | Nepomniachtchi et al. | |
| 7,949,176 B2 | 5/2011 | Nepomniachtchi | |
| 7,953,268 B2 | 5/2011 | Nepomniachtchi | |
| 7,978,900 B2 | 7/2011 | Nepomniachtchi et al. | |
| 8,000,514 B2 | 8/2011 | Nepomniachtchi et al. | |
| 8,326,015 B2 | 12/2012 | Nepomniachtchi | |
| 8,379,914 B2 | 2/2013 | Nepomniachtchi et al. | |
| 8,452,098 B2 | 5/2013 | Nepomniachtchi et al. | |
| 8,483,473 B2 | 7/2013 | Roach et al. | |
| 8,577,118 B2 | 11/2013 | Nepomniachtchi et al. | |
| 8,582,862 B2 | 11/2013 | Nepomniachtchi et al. | |
| 8,831,361 B2 | 9/2014 | Pintsov | |
| 8,995,774 B1 | 3/2015 | van Deventer et al. | |
| 9,269,010 B2 | 2/2016 | Abulafia et al. | |
| 9,369,287 B1 * | 6/2016 | Sarvestani | G06F 21/608 |
| 9,373,030 B2 | 6/2016 | van Deventer et al. | |
| 9,495,586 B1 | 11/2016 | Hagen et al. | |
| 9,665,754 B2 * | 5/2017 | Hagen | G06K 7/10386 |
| 9,740,926 B2 | 8/2017 | Hagen et al. | |
| 9,842,331 B2 | 12/2017 | Nepomniachtchi et al. | |
| 10,372,950 B2 * | 8/2019 | Hagen | G06Q 50/00 |
| 2002/0169721 A1 * | 11/2002 | Cooley | G06F 21/31 |
| | | | 705/51 |
| 2004/0049401 A1 | 3/2004 | Carr et al. | |
| 2005/0007236 A1 * | 1/2005 | Lane | G06K 19/025 |
| | | | 340/5.86 |
| 2005/0067487 A1 * | 3/2005 | Brundage | G06K 19/16 |
| | | | 235/380 |
| 2006/0057550 A1 | 3/2006 | Sahashi | |
| 2006/0267737 A1 * | 11/2006 | Colby | G06K 19/0707 |
| | | | 340/10.51 |
| 2006/0274945 A1 * | 12/2006 | Chu | G06Q 10/10 |
| | | | 382/190 |
| 2007/0109101 A1 * | 5/2007 | Colby | G06K 19/0723 |
| | | | 340/10.4 |
| 2007/0122004 A1 * | 5/2007 | Brown | H04L 9/3066 |
| | | | 382/115 |
| 2007/0172155 A1 | 7/2007 | Guckenberger | |
| 2007/0200679 A1 * | 8/2007 | Colby | G06K 19/07345 |
| | | | 340/10.51 |
| 2007/0200680 A1 * | 8/2007 | Colby | G06K 19/07345 |
| | | | 340/10.51 |
| 2007/0200681 A1 * | 8/2007 | Colby | G06K 19/025 |
| | | | 340/10.51 |
| 2007/0200684 A1 * | 8/2007 | Colby | G06K 19/072 |
| | | | 340/10.51 |
| 2008/0046366 A1 | 2/2008 | Bemmel et al. | |
| 2008/0144947 A1 * | 6/2008 | Alasia | G06K 9/00577 |
| | | | 382/232 |
| 2008/0195858 A1 * | 8/2008 | Nguyen | G06F 21/6245 |
| | | | 713/151 |
| 2008/0211622 A1 * | 9/2008 | Rindtorff | G06K 7/0008 |
| | | | 340/5.2 |
| 2008/0238681 A1 * | 10/2008 | Rodgers | G06K 19/07309 |
| | | | 340/572.4 |
| 2008/0279959 A1 * | 11/2008 | Holmes | A01N 25/34 |
| | | | 424/618 |
| 2009/0154778 A1 * | 6/2009 | Lei | G06K 9/00456 |
| | | | 382/112 |
| 2010/0052852 A1 * | 3/2010 | Mohanty | G07C 9/00087 |
| | | | 340/5.83 |
| 2010/0066072 A1 * | 3/2010 | Paeschke | G06K 19/077 |
| | | | 283/83 |
| 2010/0150348 A1 * | 6/2010 | Fairbanks | H04L 9/0863 |
| | | | 380/255 |
| 2010/0245034 A1 * | 9/2010 | D'Oliveiro | H04L 9/0844 |
| | | | 340/5.6 |
| 2010/0263034 A1 * | 10/2010 | Banchelin | G06K 19/073 |
| | | | 726/7 |
| 2010/0329577 A1 | 12/2010 | Kitai | |
| 2010/0332838 A1 * | 12/2010 | Zhu | H04L 9/3231 |
| | | | 713/175 |
| 2011/0068173 A1 * | 3/2011 | Powers | G06K 7/14 |
| | | | 235/462.06 |
| 2011/0209192 A1 | 8/2011 | LeClerc Greer et al. | |
| 2011/0309146 A1 * | 12/2011 | Zazzu | G06K 19/16 |
| | | | 235/440 |
| 2012/0011010 A1 * | 1/2012 | Boulanouar | G06Q 10/10 |
| | | | 705/17 |
| 2012/0154246 A1 * | 6/2012 | Tietke | G06K 7/0008 |
| | | | 343/867 |
| 2012/0155700 A1 * | 6/2012 | Huang | H04N 1/32138 |
| | | | 382/100 |
| 2012/0229872 A1 * | 9/2012 | Dolev | G06F 21/64 |
| | | | 358/448 |
| 2012/0230577 A1 | 9/2012 | Calman et al. | |
| 2012/0299709 A1 * | 11/2012 | Nishimura | G05B 19/0426 |
| | | | 340/12.23 |
| 2013/0198079 A1 | 8/2013 | Mattes et al. | |
| 2013/0204786 A1 | 8/2013 | Mattes et al. | |
| 2013/0222119 A1 * | 8/2013 | Tietke | G06K 7/0008 |
| | | | 340/10.5 |
| 2013/0243266 A1 * | 9/2013 | Lazzouni | G06K 9/00885 |
| | | | 382/115 |
| 2013/0305059 A1 * | 11/2013 | Gormley | G07F 7/08 |
| | | | 713/189 |
| 2013/0311788 A1 * | 11/2013 | Faher | G06F 21/35 |
| | | | 713/189 |
| 2014/0003717 A1 | 1/2014 | Brito et al. | |
| 2014/0029857 A1 | 1/2014 | Kompalli et al. | |
| 2014/0046954 A1 * | 2/2014 | MacLean | G06F 17/2241 |
| | | | 707/748 |
| 2014/0052636 A1 | 2/2014 | Mattes | |
| 2014/0058951 A1 * | 2/2014 | Kuppuswamy | G06Q 20/223 |
| | | | 705/67 |
| 2014/0230039 A1 * | 8/2014 | Prakash | G06F 21/35 |
| | | | 726/9 |
| 2014/0253297 A1 * | 9/2014 | Kawaguchi | G06Q 10/083 |
| | | | 340/10.51 |
| 2014/0270400 A1 * | 9/2014 | Natale | G06Q 10/02 |
| | | | 382/115 |
| 2015/0078671 A1 | 3/2015 | van Deventer et al. | |
| 2015/0088776 A1 * | 3/2015 | Parrish | G06Q 10/00 |
| | | | 705/325 |
| 2015/0170085 A1 * | 6/2015 | Amtrup | G06Q 10/06316 |
| | | | 705/7.26 |
| 2015/0199568 A1 * | 7/2015 | van Deventer | G06K 9/00463 |
| | | | 382/217 |
| 2015/0347839 A1 * | 12/2015 | Hagen | G06K 7/10386 |
| | | | 382/187 |
| 2016/0104041 A1 * | 4/2016 | Bowers | G06K 9/00483 |
| | | | 382/115 |
| 2016/0162729 A1 | 6/2016 | Hagen et al. | |
| 2016/0210621 A1 * | 7/2016 | Khan | G06Q 20/3821 |
| 2017/0255800 A1 * | 9/2017 | Hagen | G06K 7/10386 |
| 2017/0324750 A1 * | 11/2017 | Khan | H04L 63/123 |
| 2018/0189583 A1 * | 7/2018 | Wohlken | G06K 9/00926 |
| 2018/0260617 A1 * | 9/2018 | Jones | G06K 9/00288 |

(56) References Cited

U.S. PATENT DOCUMENTS

FOREIGN PATENT DOCUMENTS

| | | | |
|---|---|---|---|
| EP | 1724707 | A2 | 11/2006 |
| EP | 1755065 | A2 | 2/2007 |
| EP | 1851668 | A2 | 11/2007 |
| EP | 1891607 | B1 | 10/2008 |
| EP | 2073153 | A1 | 6/2009 |
| EP | 2100403 | A2 | 9/2009 |
| EP | 2075726 | B1 | 7/2010 |
| EP | 2240878 | A2 | 10/2010 |
| EP | 2274702 | A1 | 1/2011 |
| EP | 1938118 | B1 | 5/2012 |
| EP | 2465075 | A1 | 6/2012 |
| EP | 2474931 | A1 | 7/2012 |
| EP | 2085913 | B1 | 8/2012 |
| EP | 2508999 | A1 | 10/2012 |
| EP | 2038811 | B1 | 1/2013 |
| EP | 2591463 | B1 | 10/2014 |
| EP | 2803016 | A1 | 11/2014 |
| EP | 2219878 | B1 | 3/2015 |
| EP | 2973378 | A1 | 1/2016 |
| EP | 2976706 | A2 | 1/2016 |
| EP | 3079103 | A1 | 10/2016 |
| EP | 3093797 | A1 | 11/2016 |
| EP | 3385895 | | 10/2018 |
| EP | 3570215 | A1 | 11/2019 |
| EP | 2798571 | B1 | 4/2020 |
| WO | WO2007105720 | | 9/2007 |
| WO | WO2014025540 | | 2/2014 |
| WO | WO2018018175 | | 2/2018 |
| WO | WO2019002832 | | 1/2019 |
| WO | WO2019009685 | | 1/2019 |

OTHER PUBLICATIONS

"Machine Readable Travel Documents (MRTDs): History, Interoperability, and Implementation", Version: Release 1, Draft 1.4, International Civil Aviation Organization, Mar. 23, 2007, pp. 1-60.
Pooters, Ivo, "Keep Out of My Passport: Access Control Mechanisms in E-Passports" in: Technical Report, Jun. 15, 2008, pp. 1-13.
Kinneging, Tom A.F., "PKI for Machine Readable Travel Documents offering ICC Read-Only Access", Version 1.1, International Civil Aviation Organization, Oct. 1, 2004, pp. 1-57.

\* cited by examiner

IDENTIFICATION VERIFICATION USING A DEVICE WITH EMBEDDED RADIO-FREQUENCY IDENTIFICATION FUNCTIONALITY

CROSS-REFERENCE TO RELATED APPLICATIONS

The present utility patent application is a continuation of and claims priority benefit of U.S. patent application Ser. No. 15/604,372, filed May 24, 2017, and issued as U.S. Pat. No. 10,372,950 on Aug. 6, 2019, which is a continuation of U.S. patent application Ser. No. 14/722,058, filed May 26, 2015 and issued as U.S. Pat. No. 9,665,754 on May 30, 2017, which is related to and claims priority benefit of U.S. provisional application No. 62/004,101, filed May 28, 2014 under 35 U.S.C. 119(e). The contents of these applications are incorporated herein by reference for all purposes to the extent that such subject matter is not inconsistent herewith or limiting hereof.

TECHNICAL FIELD

The present disclosure relates generally to data processing and, more specifically, to identification (ID) verification using a device with embedded radio-frequency identification (RFID) functionality.

BACKGROUND

Use of RFID systems to transfer data has opened new possibilities in computing and business. One such possibility is the use of RFID chips in biometric documents. A biometric document is a combined paper and electronic document (for example, a biometric passport) that contains biometric information and can be used to authenticate the identity of its holder. The RFID chip can be embedded in the front or back cover or center page of the biometric document. RFID enabled systems can read information from documents with embedded RFID chips using contactless technology. The use of RFID enabled ID documents can prevent falsification of ID documents as well as tampering, fraud, and other crimes using false documents.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are methods and systems for ID document verification. In general, the disclosed methods and systems are related to data processing and scanning RFID chips to retrieve data and verify an ID document. In the present disclosure, a system is provided that assists a user in verifying authenticity of the ID document. Additionally, the disclosed methods and systems can facilitate entering data related to ID documents.

According to one example embodiment of the disclosure, a system for ID document verification is provided. The system includes a processor associated with a client device and an RFID reader (or a near-field communication (NFC) reader). The RFID reader may be embedded in a client device or can be an external device communicating with the client device via a headphone port or wirelessly (e.g. Bluetooth). The processor may be configured to receive an image of an ID document. The ID document may include an embedded RFID chip storing digital data associated with the ID document. The processor may further be configured to transmit the image to a server to retrieve printed data associated with the ID document and receive the printed data from the server. Using the printed data, the RFID reader may unlock the RFID chip and retrieve the digital data from the RFID chip. The digital data can be transmitted to the processor. The processor may analyze the digital data and, based on the analysis, provide a verification result for the ID document. Furthermore, the processor may generate a key to activate the embedded RFID chip.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

Identity verification is important in enabling and securing financial operations, hiring processes, health care, professional services, and so forth. However, ID documents can be tampered with and falsified for fraudulent purposes. To provide an additional protective measure, an RFID chip can be embedded in the ID document. Digital data stored on the RFID chip can duplicate data printed on the ID document. The digital data can be authenticated via Public Key Infrastructure, which makes forgery difficult and expensive. However, conventional digital verification using RFID chip requires special purpose readers.

A system for ID document verification is provided. The system for ID document verification can allow verification of ID documentation having an embedded RFID chip. An image of the ID document can be captured using a camera associated with a client device. The client device can transmit the ID document image to a server for processing for retrieval of printed data represented by the ID document (e.g., holder's name, age, fingerprints, document number, and expiration date). The retrieved data may be sent back to the client device and further to a server. The system for ID document verification residing on the client device may use the retrieved data as a key to unlock the RFID chip and access digital data stored in the RFID chip. The digital data may be transmitted to the server, where the system for ID document verification compares the printed and digital data to determine whether the printed and digital data are identical. Additionally, the system for ID document verification may perform a facial recognition using the printed and digital data. Based on the comparison and/or recognition, similarities between the printed and digital data may be ascertained. Such verification can establish whether printed data in the ID document was altered and whether the ID document is authentic.

In some embodiments, the system for ID document verification can also allow for personal information extraction from a physical ID document.

Figure 1:
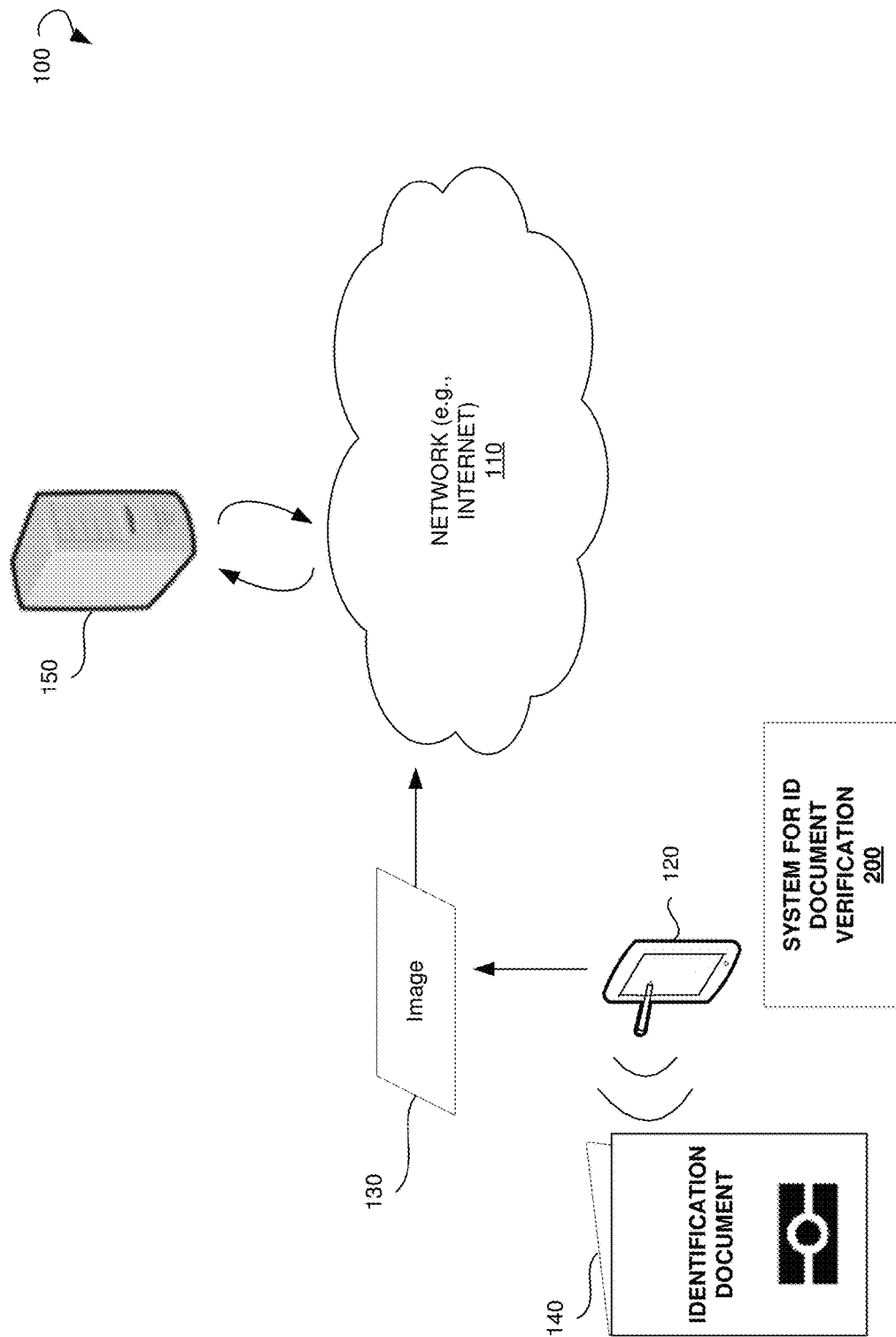
FIG. 1 illustrates an environment within which systems and methods for ID document verification are implemented.

FIG. 1 illustrates an environment 100 within which the systems and methods for ID document verification can be implemented, in accordance to some embodiments. A system 200 for ID document verification may include a server-based distributed application, which may include a central component residing on a server 150 and one or more client applications residing on a client device 120 and communicating with the central component via a network 110. A user may communicate with the system 200 via a client application available through the client device 120. In other embodiments, the system 200 may be a cloud-based application with the central component residing on the server 150 and accessible via a web browser on the client device 120.

The network 110 may include the Internet or any other network capable of communicating data between devices. Suitable networks may include or interface with any one or more of, for instance, a local intranet, a Personal Area Network, a Local Area Network (LAN), a Wide Area Network (WAN), a Metropolitan Area Network (MAN), a Virtual Private Network (VPN), a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network (ISDN) line, a dial-up port such as a V.90, V.34 or V.34bis analog modem connection, a cable modem, an Asynchronous Transfer Mode connection, or an Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System (GPS), cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an infrared port, a Small Computer Systems Interface connection, a Universal Serial Bus (USB) connection or other wired or wireless, digital or analog interface or connection, mesh, or Digi® networking. The network 110 may include a network of data processing nodes that are interconnected for the purpose of data communication. The network may include a Software-defined Networking (SDN). The SDN may include one or more of the above network types. Generally, the network 110 may include a number of similar or dissimilar devices connected together by a transport medium enabling communication between the devices by using a predefined protocol. Those skilled in the art will recognize that the present disclosure may be practiced within a variety of network configuration environments and on a variety of computing devices.

An ID document 140 can include a document having an embedded RFID chip (for example, a biometric passport, digital passport, government issued ID, drivers' license, and so forth).

To verify the ID document 140, a user can cause the system 200 capture an image 130 of the ID document 140 by using a camera associated with the client device 120 (smart phone, a notebook, a personal computer (PC), a tablet PC, or the like). An image 130 associated with the ID document 140 may be transmitted to the server 150 either via a mobile application, a stand-alone web application, or via a fully integrated service (XML, i-frame). The image 130 may be captured by a camera associated with the client device 120, e.g. a phone camera, a tablet PC camera, and so forth. The server 150 may receive and analyze the image 130 to recognize printed data associated with the ID document 140 (for example, issue date, holder's name, age, gender, holder's fingerprint, and so forth). Printed data can be recognized by optical character recognition (OCR).

The results of the printed data analysis can be transmitted back to the client device 120. The client device 120 may scan the RFID chip embedded in the ID document 140 using an RFID reader (or an NFC reader). The RFID reader can be a part of the client device 120 or it can be detachably attached to the client device 120 via one of the ports. Alternatively, the RFID reader can be a stand-alone device and the client device 120 can communicate with it wirelessly (for example, via Bluetooth).

The retrieved printed data can be used as a key to access the digital data on the RFID chip of the ID document 140. By matching the digital and printed data, the system 200 for ID document verification may confirm authenticity of the ID document 140.

Figure 2:
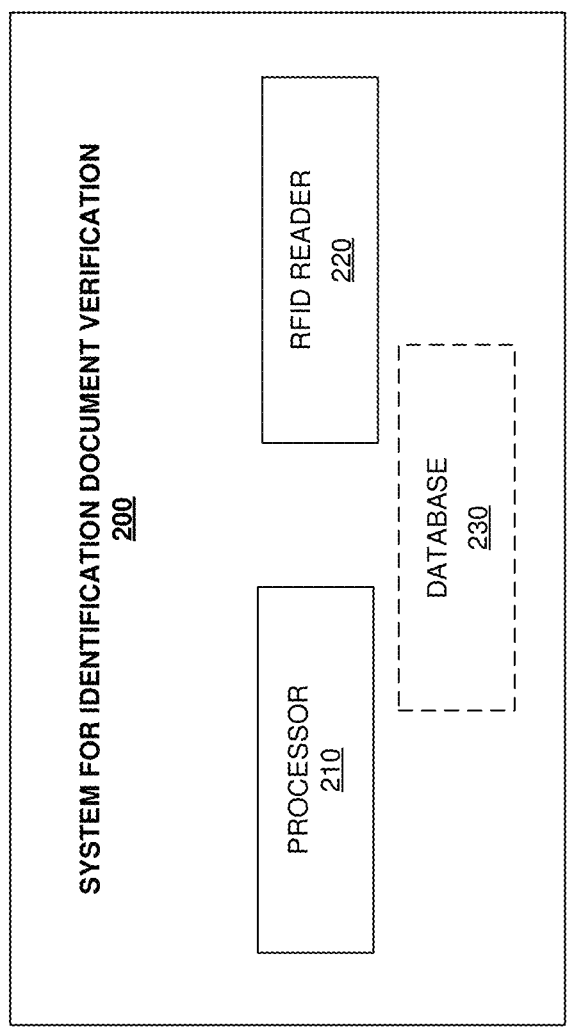
FIG. 2 is a block diagram showing a system for ID document verification.

FIG. 2 shows a detailed block diagram of the system 200 for ID document verification, in accordance with an example embodiment. The system 200 may include a processor 210, an RFID reader 220, and an optional database 230. The processor 210 may be configured to receive an image associated with an ID document. The image may be captured by the camera associated with the client device. The processor 210 may transmit the image to a remote server. The server processes the image using OCR to detect various zones on the image containing data associated with the ID document and a holder of the ID document and extract printed data from the image. The processor 210 may be further configured to receive the extracted printed data from the server. The RFID reader 220 may use the printed data as a key to access the RFID chip of the ID document. In such a way, the RFID reader 220 may retrieve digital data from the RFID chip. The processor 210 may analyze the digital data and match the digital and printed data to check if they are identical. Alternatively, a server may perform the analysis. The server may further perform facial recognition based on photos from the digital data (e.g., RFID passphoto), from the printed data (e.g., passphoto ID), and/or a photo of the user captured by the client device. If the digital and printed data proves identical, the ID document may be verified. If the digital and printed data differ or are absent or nonstandard, the ID document may be refused.

An optional database 230 may be configured to store printed data and digital data as well as verification results.

The processor 210 may comprise, or may be in communication with, media (for example, computer-readable media) that stores instructions that, when executed by the processor 210, cause the processor 210 to perform the elements described herein. Furthermore, the processor 210 may operate any operating system capable of supporting locally executed applications, client-server based applications, and/or browser or browser-enabled applications.

Figure 3:
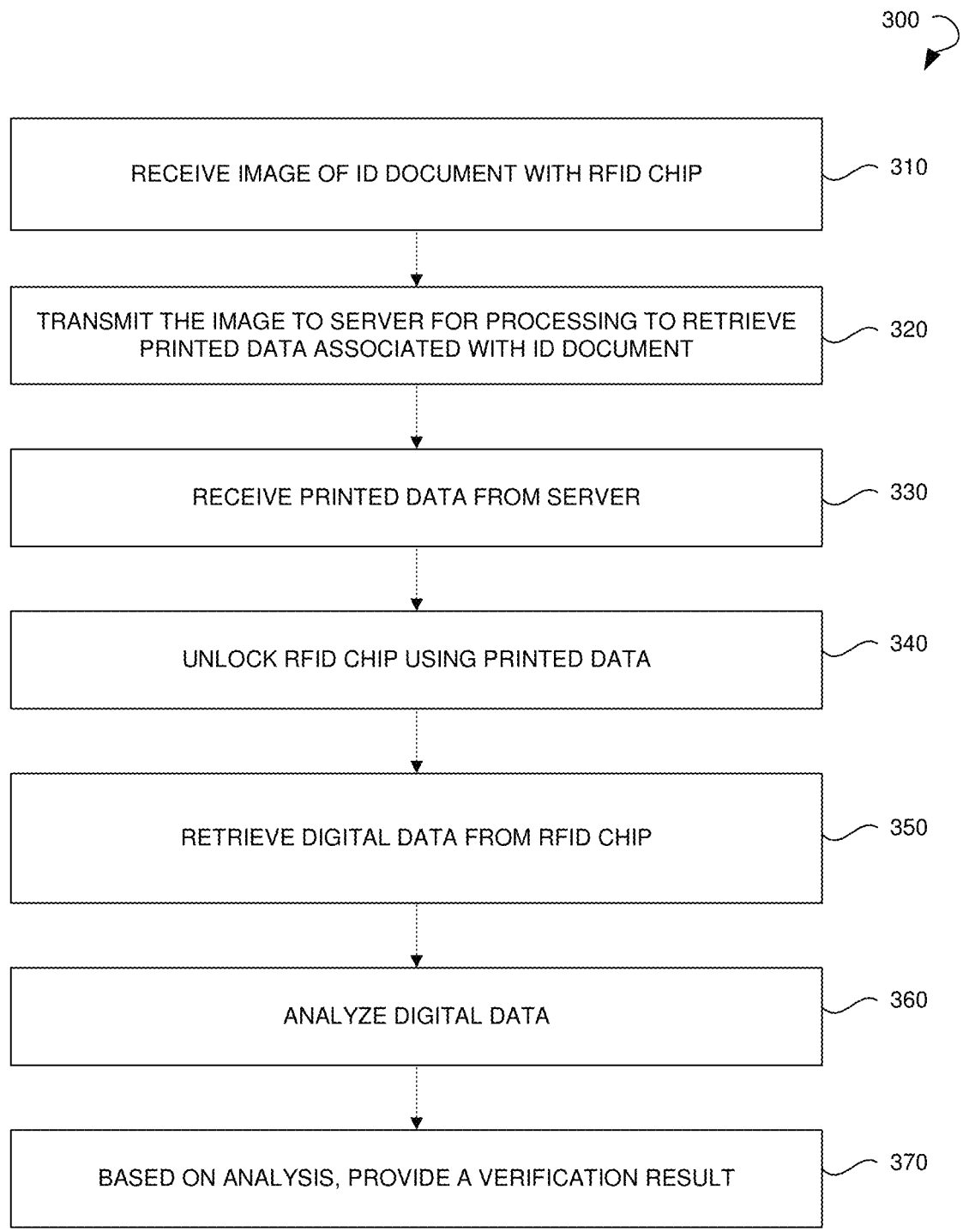
FIG. 3 is a process flow diagram showing a method for ID document verification.

FIG. 3 is a process flow diagram showing a method 300 for ID document verification within the environment described with reference to FIG. 1. The method 300 may commence with receiving an image of an ID document that has an embedded RFID chip at operation 310. The ID document may include a government issued ID, a student ID, an employment ID, a driver's license, a passport, a travel document, and so forth. The received image may include a picture, a scan, and so forth. The image may be captured by a camera associated with the user (for example, a standalone camera; a camera of a user device, such as a smart phone, a PC, a tablet PC; and so forth).

The method 300 may proceed with transmitting the image to a server for processing at operation 320. The processing can include optical character recognition to obtain printed data. The printed data may include holder's name, date of birth, gender, fingerprint, document number, and so forth. The printed data obtained as a result of processing may be received from the server at operation 330 and used to unlock the RFID chip at operation 340. After unlocking the RFID chip (for example, using any recognized text as a key to access the RFID chip), digital data (or biometric data) stored in the RFID chip may be retrieved at operation 350.

At operation 360, the digital data may be analyzed to check the authenticity of the ID document. The digital data in general duplicates the printed data. By comparing the digital data from the RFID chip and the recognized printed data, the system for ID document verification can ensure that printed data was not altered and the ID document is not forged. Based on the analysis, the system may determine that the digital data and printed data are identical and verify the ID document. Alternatively, according to the analysis, the system may determine one or more evidences of forgery (for example, a difference of the printed data and the digital data, an absence of the digital data, nonstandard digital data, and so forth). On the determining the one or more evidences of forgery, the system may reject the ID document. A verification result may be provided at operation 370.

In some embodiments, data of the verified ID document may be used to automatically populate an electronic form, fields associated with a web resource, and so forth. Thus, filling in forms, may be facilitated and accelerated. Moreover, automatic filling in of electronic forms or blanks allows avoiding mistakes and misprints pertaining to manual entry.

Figure 4:
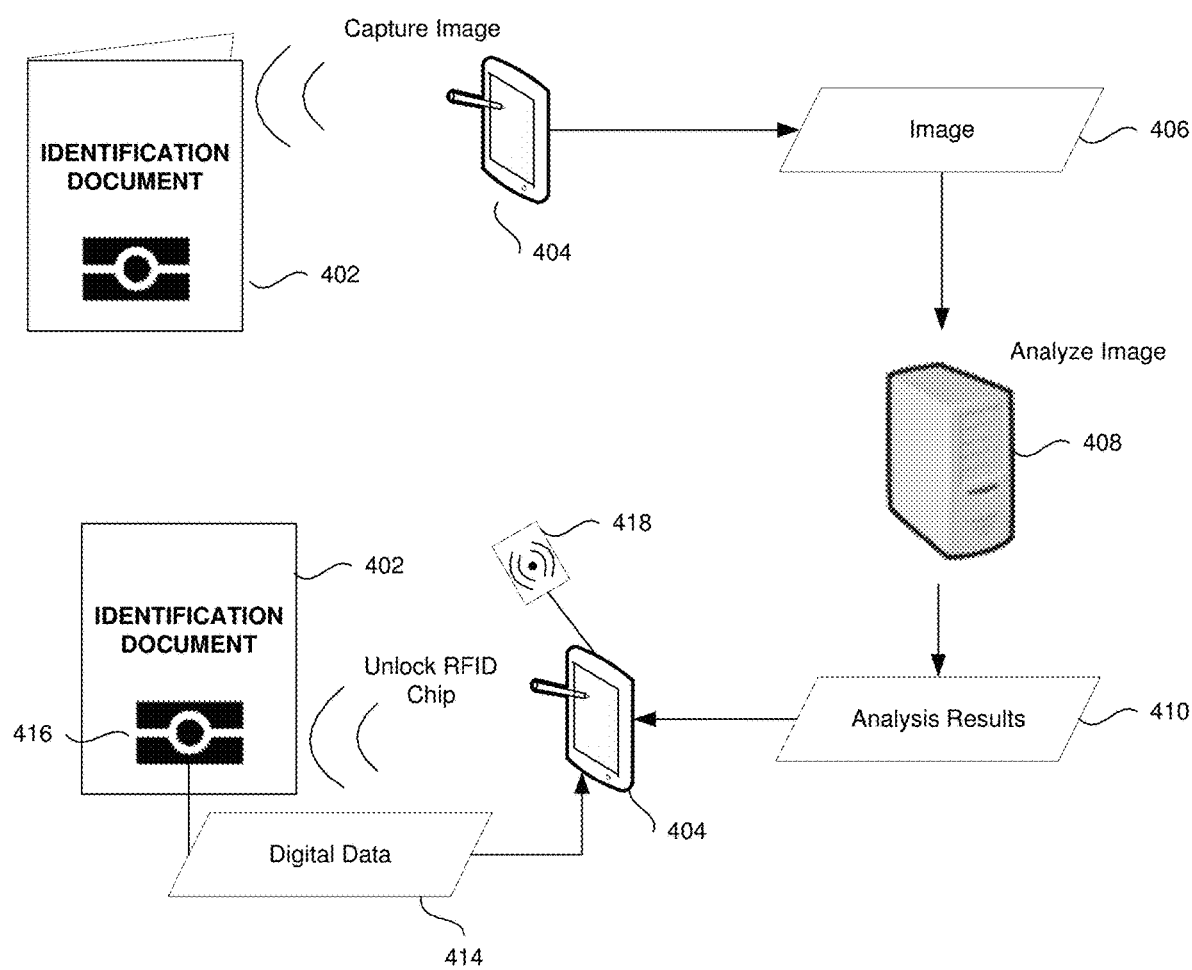
FIG. 4 illustrates accessing digital data related to an ID document.

FIG. 4 illustrates accessing digital data 400 in a RFID chip associated with the ID document, in accordance with some embodiments. A user may capture an image 406 of an ID document 402 using a camera embedded in or connected to a client device 404. The image 406 may be automatically transmitted to a server 408. The image 406 received by the server 408 may be subjected to OCR. Printed information in the image 406 may be analyzed to extract textual and/or other relevant data associated with the ID document 402 and the holder of the ID document 402 (e.g., holder's date of birth, first name, last name, and the like). The results of the analysis 410 can be transmitted back to the client device 404.

The client device 404 can scan an RFID chip 416 in the ID document 402 using an RFID reader 418 (or an NFC reader). The RFID reader 418 can be either embedded in the client device 404 or detachably attached to the client device 404 via a port of the client device 404. The digital data 414 in the RFID chip 416 may be encrypted, so the retrieved printed data can be used as a key to access the digital data 414.

The digital data 414 and printed data can be compared on the client device 404 to verify ID document identity. Additionally, the digital data 414 can be used to fill-in forms, employment forms, medical records, and so forth.

Figure 5:
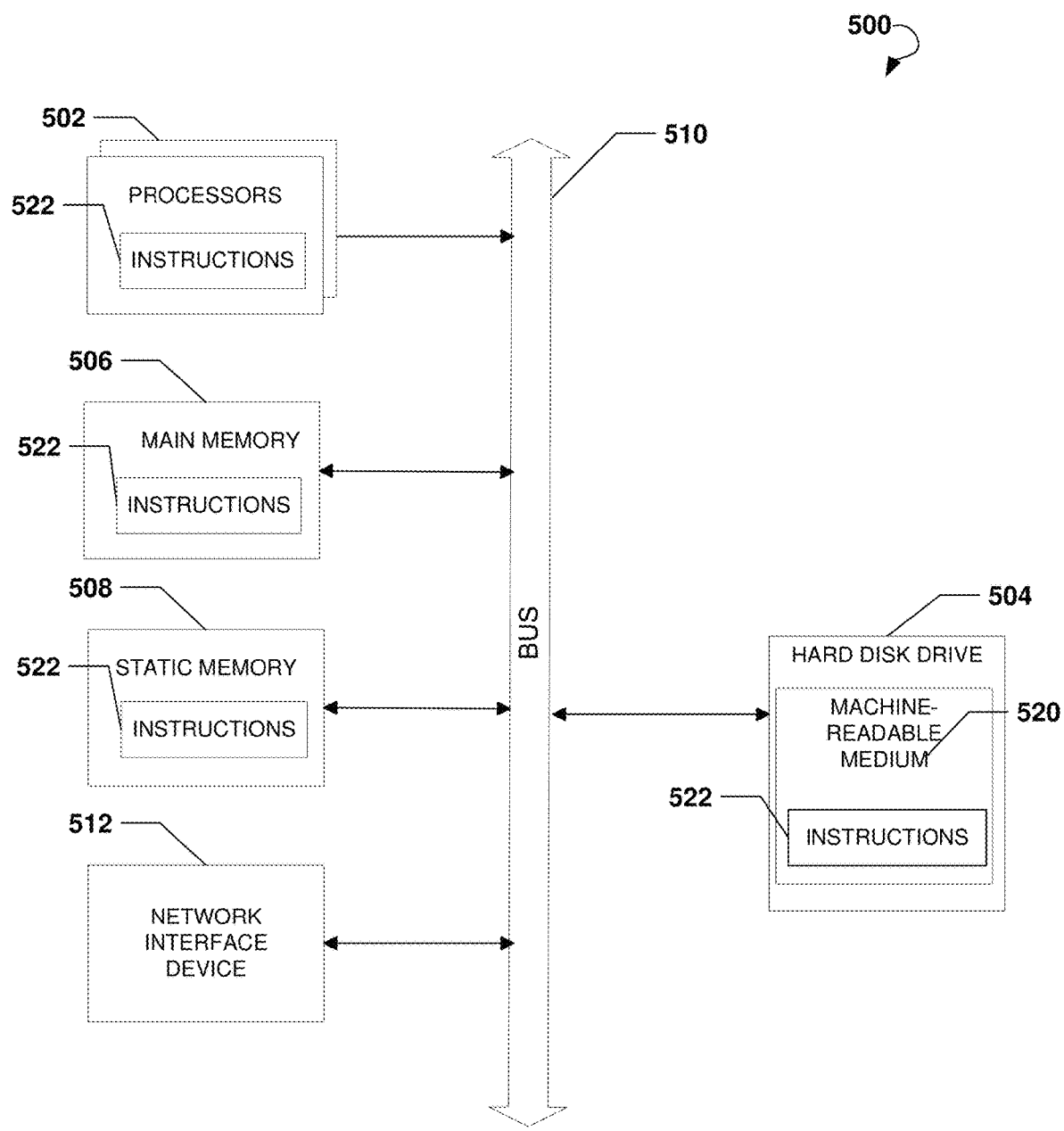
FIG. 5 illustrates a diagrammatic representation of a computing device for a machine in the exemplary electronic form of a computer system, within which a set of instructions for causing the machine to perform any one or more of the methodologies discussed herein can be executed.

FIG. 5 shows a diagrammatic representation of a computing device for a machine in the exemplary electronic form of a computer system 500, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box, a cellular telephone, a digital camera, a portable music player (e.g., a portable hard drive audio device, such as an Moving Picture Experts Group Audio Layer 3 player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502, a hard disk drive 504, a main memory 506, and a static memory 508, which communicate with each other via a bus 510. The computer system 500 may also include a network interface device 512. The hard disk drive 504 may include a computer-readable medium 520, which stores one or more sets of instructions 522 embodying or utilized by any one or more of the methodologies or functions described herein. The instructions 522 can also reside, completely or at least partially, within the main memory 506, the static memory 508, and/or within the processors 502 during execution thereof by the computer system 500. The main memory 506 and the processors 502 also constitute machine-readable media.

While the computer-readable medium 520 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks (DVDs), Random Access Memory (RAM), Read-Only Memory (ROM), and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a client device, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a Programmable Read-Only Memory (PROM), an Erasable Programmable Read-Only Memory (EPROM), an Electrically Erasable Programmable Read-Only Memory (EEPROM), a FlashEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, computer-implemented methods and systems for identification document verification are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A computer-implemented method for identification (ID) verification using a device with embedded radio-frequency identification (RFID) functionality, the method comprising:
    receiving, by a client device, an image of an ID document of a user, wherein the ID document includes an RFID chip storing digital data associated with the ID document, the RFID chip being embedded in the ID document;
    receiving, by the client device, a photo of the user;
    capturing, by a camera associated with the client device, the image of the ID document and the photo of the user;
    transmitting, by the client device, the image to a server to retrieve printed data associated with the ID document;
    performing, by the server, facial recognition on the photo of the user, the printed data associated with the ID document, and the digital data from the RFID chip;
    comparing, by the server, facial recognition results from the photo of the user, the printed data associated with the ID document, and the digital data from the RFID chip;
    receiving, from the server, the printed data;
    unlocking, by an RFID reader, the RFID chip using the printed data;
    retrieving, by the RFID reader, the digital data from the RFID chip;
    sending, by the client device, the digital data retrieved from the RFID chip to the server;
    comparing, by the server, the digital data from the RFID chip of the ID document with the printed data associated with the ID document;
    based on the comparing, providing, by the server, a verification result for the ID document; and
    transmitting, by the server, the verification result to the client device.

2. The method of claim 1, wherein the verification result comprises a confirmation of authenticity of the ID document when the digital data from the RFID chip of the ID document is identical to the printed data associated with the ID document.

3. The method of claim 1, wherein the verification result comprises a determination of at least one evidence of falsification.

4. The method of claim 3, wherein the at least one evidence of falsification includes a discrepancy between the printed data and the digital data, an absence of the digital data, and nonstandard digital data.

5. The method of claim 3, wherein in response to the determination of at least one evidence of falsification, rejecting, by the server, the ID document.

6. The method of claim 1, wherein the comparing the digital data from the RFID chip of the ID document with the printed data associated with the ID document comprises comparing an RFID passphoto from the digital data from the RFID chip with a passphoto ID associated with the ID document.

7. A system for identification (ID) document verification, the system comprising:
    a processor associated with a client device and configured to:
        receive a photo of a user;
        receive an image of an ID document, wherein the ID document includes a radio-frequency identification (RFID) chip storing digital data associated with the ID document, the RFID chip being embedded in the ID document;
        transmit the image to a server to retrieve printed data associated with the ID document;
        receive the printed data from the server;
        receive the digital data from the RFID chip from an RFID reader communicably coupled with the client device; and
        send the digital data retrieved from the RFID chip to the server, the server configured to:
            perform facial recognition on the photo of the user, the printed data associated with the ID document, and the digital data from the RFID chip;
            compare facial recognition results from the photo of the user, the printed data associated with the ID document, and the digital data from the RFID chip;
            compare the digital data from the RFID chip of the ID document with the printed data associated with the ID document;
            based on the comparing, provide a verification result for the ID document; and
            transmit the verification result to the client device.

8. The system of claim 7, wherein the verification result comprises a confirmation of authenticity of the ID document when the digital data from the RFID chip of the ID document is identical to the printed data associated with the ID document.

9. The system claim 7, wherein the verification result comprises a determination of at least one evidence of falsification.

10. The system of claim 9, wherein the at least one evidence of falsification includes a discrepancy between the printed data and the digital data, an absence of the digital data, and nonstandard digital data.

11. The system of claim 10, wherein in response to the determination of at least one evidence of falsification, rejecting, by the server, the ID document.

12. The system of claim 7, further comprising a camera configured to capture the image of the ID document and the photo of the user, wherein the camera is connected to the client device or is a standalone camera.

13. The system of claim 7, wherein the comparing by the server the digital data from the RFID chip of the ID document with the printed data associated with the ID document comprises comparing an RFID passphoto from the digital data from the RFID chip with a passphoto ID associated with the ID document.

14. A system for identification (ID) document verification, the system comprising:
    a camera configured to capture a photo of a user and an image of an ID document of the user, wherein the camera is connected to a client device; and
    a processor associated with the client device and configured to:
        receive the photo of the user and the image of the ID document, wherein the ID document includes a radio-frequency identification (RFID) chip storing digital data associated with the ID document, the RFID chip being embedded in the ID document;

transmit the photo of the user and the image of the ID document to a server;

receive the digital data from the RFID chip from an RFID reader communicably coupled with the client device; and send the digital data retrieved from the RFID chip to the server, the server configured to:

perform facial recognition on the photo of the user, the image of the ID document, and the digital data from the RFID chip;

compare facial recognition results from the photo of the user, the image of the ID document, and the digital data from the RFID chip; and based on the comparing, provide a verification result for the ID document.

15. The system of claim 14, wherein the image of the ID document comprises a passphoto ID and the digital data from the RFID chip comprises an RFID passphoto.

16. A computer-implemented method for identification (ID) verification using a device with embedded radio-frequency identification (RFID) functionality, the method comprising:

receiving, by a client device, an image of an ID document, wherein the ID document includes an RFID chip storing digital data associated with the ID document, the RFID chip being embedded in the ID document;

transmitting, by the client device, the image to a server to retrieve printed data associated with the ID document;

receiving, from the server, the printed data;

unlocking, by an RFID reader, the RFID chip using the printed data;

retrieving, by the RFID reader, the digital data from the RFID chip;

sending, by the client device, the digital data retrieved from the RFID chip to the server;

comparing, by the server, the digital data from the RFID chip of the ID document with the printed data associated with the ID document, wherein comparing further comprises comparing an RFID passphoto from the digital data from the RFID chip with a passphoto ID associated with the ID document;

based on the comparing, providing, by the server, a verification result for the ID document and the RFID passphoto; and transmitting, by the server, the verification result to the client device.

* * * * *

UNITED STATES PATENT AND TRADEMARK OFFICE
CERTIFICATE OF CORRECTION

PATENT NO. : 10,747,971 B2  Page 1 of 1
APPLICATION NO. : 16/529293
DATED : August 18, 2020
INVENTOR(S) : Michael Hagen It is certified that error appears in the above-identified patent and that said Letters Patent is hereby corrected as shown below:

On Page 2, in the Related U.S. Application Data field, Item (60), that portion reading:
--Provisional application No. 62/204,101--
Should read:
--Provisional application No. 62/004,101--

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*